United States Patent
Kim et al.

(10) Patent No.: US 11,322,799 B2
(45) Date of Patent: May 3, 2022

(54) ELECTRODE INCLUDING SINGLE-SIDED ELECTRODE WITH INORGANIC COATING LAYER ATTACHED TO SLURRY ON COLLECTOR AND ELECTRODE ASSEMBLY INCLUDING THE SAME

(71) Applicant: LG Chem, Ltd., Seoul (KR)

(72) Inventors: Yong Jun Kim, Daejeon (KR); Seok Koo Kim, Daejeon (KR)

(73) Assignee: LG Energy Solution, Ltd.

( * ) Notice: Subject to any disclaimer, the term of this patent is extended or adjusted under 35 U.S.C. 154(b) by 110 days.

(21) Appl. No.: 16/603,755

(22) PCT Filed: Nov. 30, 2018

(86) PCT No.: PCT/KR2018/015094
§ 371 (c)(1),
(2) Date: Oct. 8, 2019

(87) PCT Pub. No.: WO2019/108017
PCT Pub. Date: Jun. 6, 2019

(65) Prior Publication Data
US 2020/0035971 A1    Jan. 30, 2020

(30) Foreign Application Priority Data

Dec. 1, 2017  (KR) .................. 10-2017-0164067
Nov. 28, 2018  (KR) .................. 10-2018-0149834

(51) Int. Cl.
*H01M 50/446*  (2021.01)
*H01M 4/13*  (2010.01)
(Continued)

(52) U.S. Cl.
CPC ........... *H01M 50/446* (2021.01); *H01M 4/13* (2013.01); *H01M 10/0525* (2013.01); *H01M 10/0583* (2013.01)

(58) Field of Classification Search
CPC .. H01M 50/446; H01M 4/13; H01M 10/0525; H01M 10/0583
(Continued)

(56) References Cited

U.S. PATENT DOCUMENTS

2010/0167124 A1  7/2010  Seo et al.
2011/0135987 A1  6/2011  Shin
(Continued)

FOREIGN PATENT DOCUMENTS

CN       1458708 A    11/2003
CN     104704653 A     6/2015
(Continued)

OTHER PUBLICATIONS

Extended European Search Report including Written Opinion for Application No. EP18884107.6, dated Apr. 20, 2020, pp. 1-11.
(Continued)

*Primary Examiner* — Sean P Cullen
(74) *Attorney, Agent, or Firm* — Lerner, David, Littenberg, Krumholz & Mentlik, LLP (57) ABSTRACT

The present invention provides an electrode assembly in which a plurality of unit cells are disposed, wherein one of the unit cells comprises: a first double-sided electrode in which a slurry is on opposite surfaces of a first collector; a separator adjacent to the first double-sided electrode; a second double-sided electrode adjacent to the separator and in which a slurry is on opposite surfaces of a second collector; and a single-sided electrode adjacent to the second double-sided electrode and in which the slurry is only on one surface of a third collector, the one surface facing the second double-sided electrode, the single-sided electrode having a coating layer on the slurry thereof, the coating layer preventing contact between the slurry of the single-sided electrode and the slurry on one of the surfaces of the second
(Continued)

collector that faces the single-sided electrode, the coating layer allowing ions to pass therethrough.

9 Claims, 11 Drawing Sheets

(51) Int. Cl.
   *H01M 10/0525* (2010.01)
   *H01M 10/0583* (2010.01)
(58) Field of Classification Search
   USPC .......................................................... 429/144
   See application file for complete search history.

(56) References Cited

U.S. PATENT DOCUMENTS

| | | | |
|---|---|---|---|
| 2014/0082930 | A1 | 3/2014 | Bouvier |
| 2014/0099538 | A1 | 4/2014 | Johnson et al. |
| 2015/0004464 | A1* | 1/2015 | Okuno ................. H01M 4/387 429/143 |
| 2016/0028064 | A1 | 1/2016 | Choi et al. |
| 2016/0308250 | A1* | 10/2016 | Jeong ................. H01M 10/4235 |
| 2016/0322618 | A1* | 11/2016 | Jeong ..................... H01M 4/485 |
| 2017/0005308 | A1 | 1/2017 | Fujii |
| 2017/0155102 | A1 | 6/2017 | Chung et al. |
| 2017/0222280 | A1 | 8/2017 | Asano et al. |
| 2017/0309915 | A1 | 10/2017 | Lee et al. |

FOREIGN PATENT DOCUMENTS

| | | | |
|---|---|---|---|
| CN | 105849963 | A | 8/2016 |
| EP | 3070776 | A1 | 9/2016 |
| EP | 3113247 | A1 | 1/2017 |
| JP | 2001076732 | A | 3/2001 |
| JP | 2009211824 | A | 9/2009 |
| JP | 2015088369 | A | 5/2015 |
| KR | 20130059769 | A | 6/2013 |
| KR | 20140026489 | A | 3/2014 |
| KR | 20140099710 | A | 8/2014 |
| KR | 20150050505 | A | 5/2015 |
| KR | 20150083281 | A | 7/2015 |
| KR | 20150083281 | A * | 7/2015 |
| KR | 20150083499 | A | 7/2015 |
| KR | 20150131513 | A * | 11/2015 |
| KR | 20160037095 | A | 4/2016 |
| KR | 20160108116 | A | 9/2016 |
| KR | 20170003392 | A | 1/2017 |

OTHER PUBLICATIONS

International Search Report for Application No. PCT/KR2018/015094, dated Mar. 29, 2019, pp. 1-2.

Search Report dated Feb. 24, 2022 from the Office Action for Chinese Application No. 201880024041.0 dated Mar. 3, 2022, 4 pages.

* cited by examiner

Structure according to the present invention

Structure according to the related art

ELECTRODE INCLUDING SINGLE-SIDED ELECTRODE WITH INORGANIC COATING LAYER ATTACHED TO SLURRY ON COLLECTOR AND ELECTRODE ASSEMBLY INCLUDING THE SAME

CROSS-REFERENCE TO RELATED APPLICATION

The present application is a national phase entry under 35 U.S.C. § 371 of International Application No. PCT/KR2018/015094, filed on Nov. 30, 2018, which claims priority from Korean Patent Application Nos. 10-2017-0164067, filed on Dec. 1, 2017, and 10-2018-0149834, filed on Nov. 28, 2018, all of which are hereby incorporated herein by reference in their entireties.

TECHNICAL FIELD

The present invention relates to an electrode assembly that is built in a secondary battery to store electric energy and an electrode that is a component of the electrode assembly, and more particularly, to an electrode assembly, which is reduced in production cost and reduced in thickness to realize a more compact size, and an electrode.

BACKGROUND ART

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged. When the oxidation reaction to the material is performed by the current, power is discharged. Such charging-discharging are repeatedly performed to generate electricity.

In general, secondary batteries comprise nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

The lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. Also, the electrode assembly is accommodated in a case such as a cylindrical can and a prismatic pouch.

The electrode assembly may be manufactured to be classified into, representatively, a winding type (jelly-roll type), a stacking type (stack type), a stack and folding type.

An electrode active material is applied to a surface of a collector made of metal foil, and dried and pressed, and then, the collector is cut to have a desired width and length to manufacture a positive electrode and a negative electrode. Then, a separator is stacked between the positive electrode and the negative electrode, and the stack is spirally wound to the winding type electrode assembly. The winding type electrode assembly has a cylindrical shape and thus is mounted on the cylinder type secondary battery. Also, the stack type electrode assembly has a structure in which a negative electrode, a separator, and a positive electrode are cut to a proper size and then successively stacked. Typically, the stack type electrode assembly is mounted on the pouch type secondary battery.

Figure 1A:
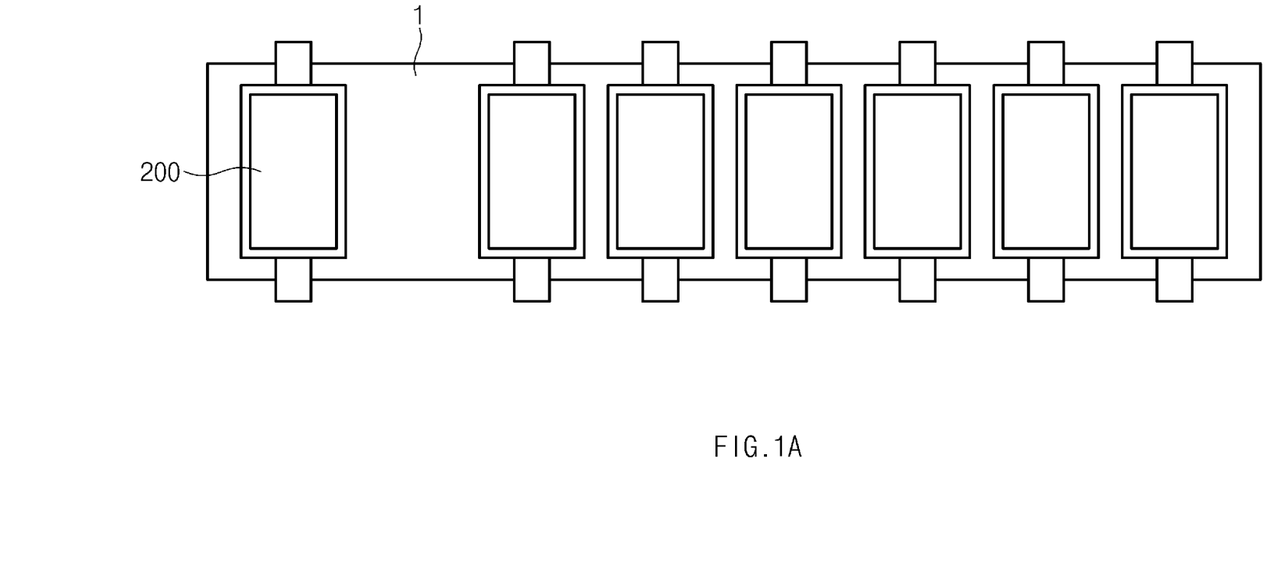
FIG. 1A is a plan view illustrating a state in which a plurality of unit cells are placed side by side on a folding separator.
Figure 1B:
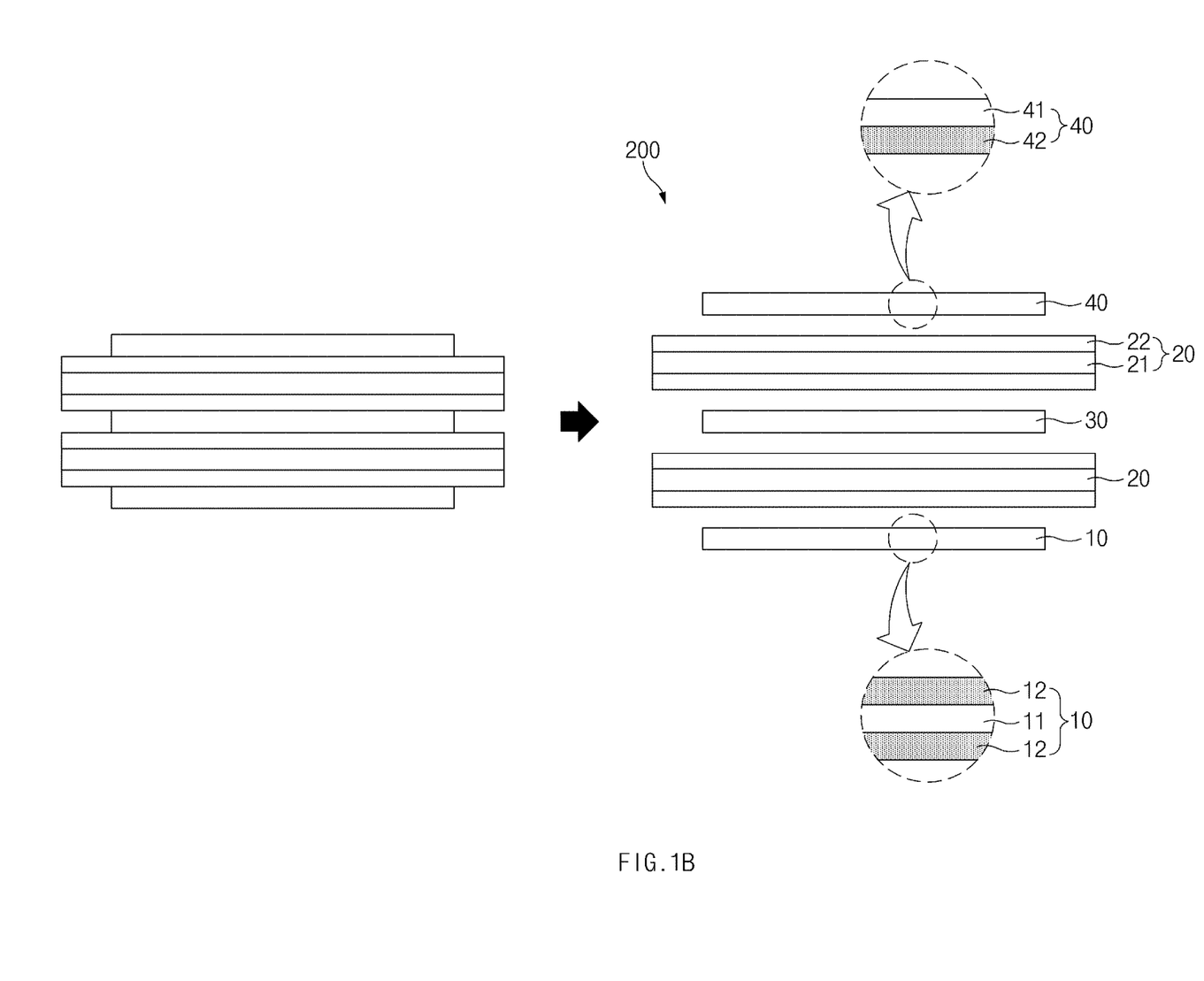
FIG. 1B is a side view illustrating a side surface of a unit cell according to a related art.

The stack and folding type electrode assembly has a structure in which the structure of the winding type electrode assembly and the structure of the stack type electrode assembly are mixed with each other. That is, each of the unit cells 200 is provided as a full cell having a predetermined unit size and a structure of a positive electrode/a separator/a negative electrode or a bicell having a predetermined unit size and a structure of a negative (positive) electrode/a separator/a positive (negative) electrode/a separator/a negative (positive) as illustrated in FIG. 1B. Thereafter, the unit cells 200 placed on a folding separator 1 as illustrated in FIG. 1A and then continuously folded as illustrated in FIG. 1C.

Figure 1C:
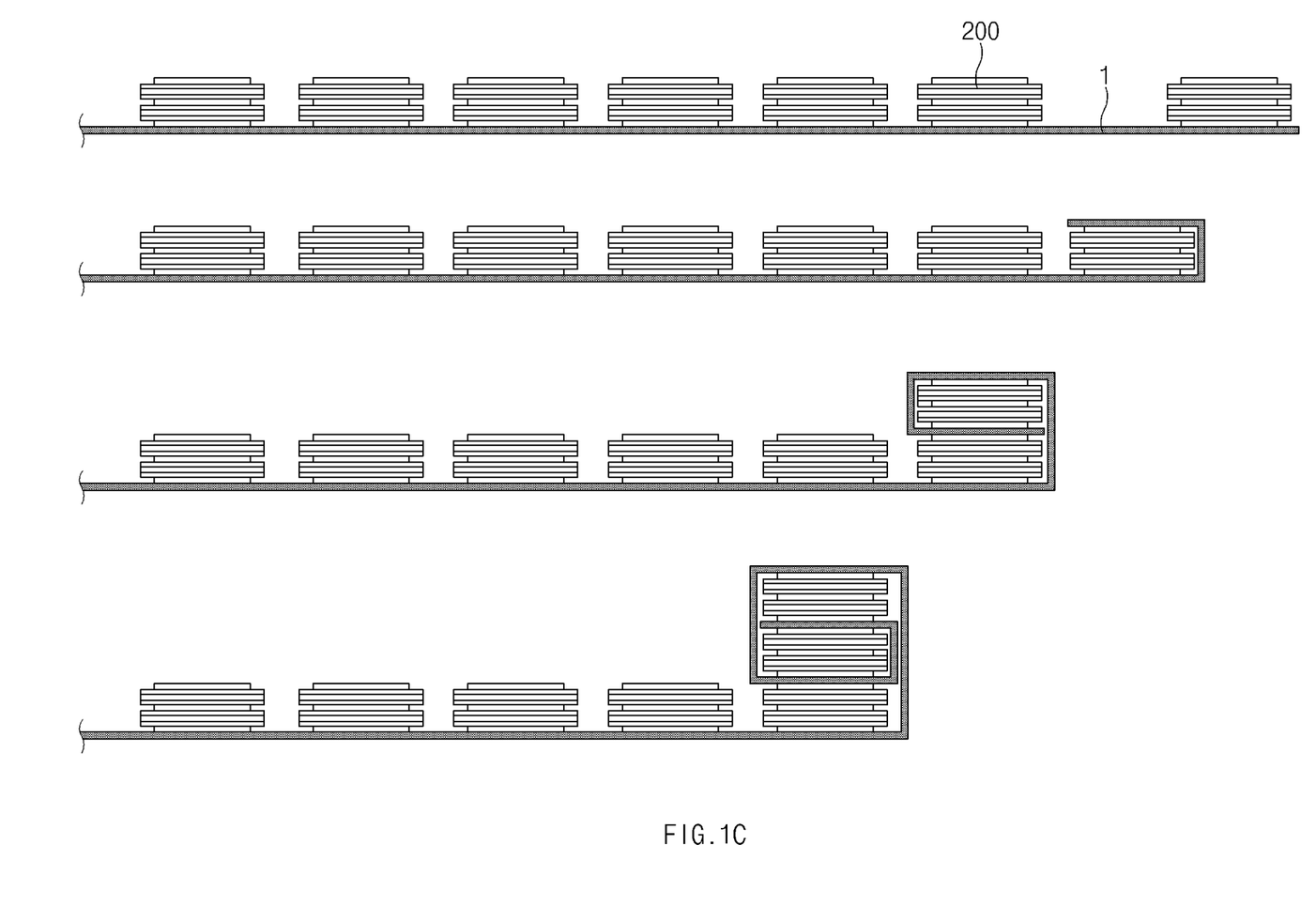
FIG. 1C is a view illustrating a state in which the unit cell according to the related art is folded in a stack and folding manner.
Figure 1D:
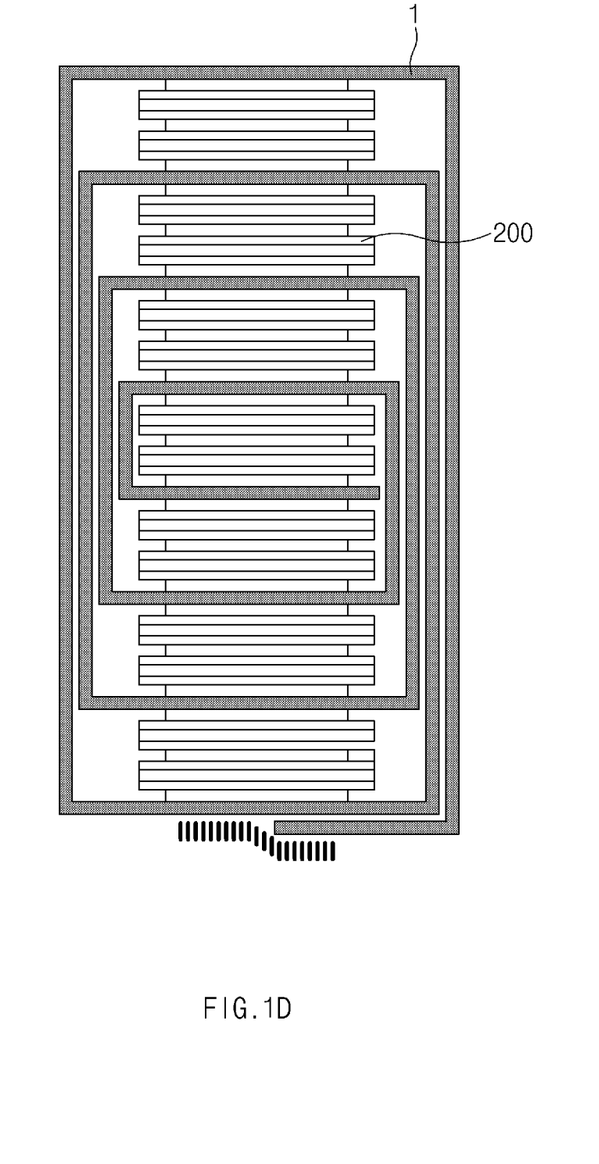
FIG. 1D is a side view illustrating a side surface of an electrode assembly in which the unit cell according to the related art is completely folded.

When the folding is completed as illustrated in FIG. 1C, the electrode assembly is manufactured as illustrated in FIG. 1D. The stack and folding type electrode assembly may be additionally supported by the folding separator 1 to improve stability in movement. However, since the folding separator 1 is added, a height of the stacked structure may increase to increase in volume.

In addition, when charging and discharging are performed in the structure in which a plurality of electrodes are stacked, heat may be generated in the structure due to movement of electrons. Here, an amount of heat generated in an intermediate layer is greater than that of heat generated in the outermost layer (that is, a temperature difference occurs between the electrodes of the outermost layer and the intermediate layer). As a result, since the temperature difference causes resistance imbalance between the stacked electrodes, when a high C-rate test (high-current charging/discharging test) is performed, and charging/discharging is performed several times, the electrodes may be degraded. Also, the temperature difference may cause lithium precipitation at the outermost positive electrodes.

DISCLOSURE OF THE INVENTION

Technical Problem

Accordingly, a main object of the present invention is to provide an electrode, which is capable of solving the above problem, and an electrode assembly.

Technical Solution

To achieve the above object, an electrode according to the present invention comprises: a collector having both surfaces facing each other; slurry applied to one surface of the collector; and a coating layer attached to facing sides of the collector with the slurry therebetween, wherein the coating layer preventing other electrodes from physically contacting the slurry and allowing ion to be accessible. The electrode may be disposed to constitute the outermost layer of a unit cell constituting an electrode assembly.

In addition, to achieve the above object, an electrode assembly according to the present invention, in which a plurality of unit cells are spaced a predetermined distance from each other and disposed in parallel to each other along a longitudinal direction of a folding separator and stacked as the folding separator is folded, wherein at least one of the unit cells, preferably the outermost unit cell disposed on the outermost layer (that is, the uppermost layer and/or the lowermost layer) comprises: a first double-sided electrode in which slurry is stacked on both surfaces of a collector; a separator stacked adjacent to the first double-sided electrode; a second double-sided electrode which is stacked adjacent to the separator and in which a slurry is stacked on both surfaces of a collector; and a single-sided electrode which is stacked adjacent to the second double-sided electrode and in which a slurry is stacked on only one surface of a collector facing the second double-sided electrode, wherein, in the single-sided electrode, a coating layer preventing contact with the second double-sided electrode on the one surface facing the second double-sided electrode and allowing ions to be accessible is attached to the single-sided electrode.

The coating layer according to the present invention may be a mixture of inorganic particles and a binder polymer and have the same component as the coating material as a coating material applied to both surface of the separator.

That is, the separator may be manufactured by applying the coating material on both surfaces of a base material, and the mixture constituting the coating layer may contain the same component as the coating material.

The mixture may contain a material having a heat-absorbing property to suppress heat generation. According to the present invention, the mixture may contain one or more of boehmite or alumina, and in more detail, in the mixture, the inorganic particles may be mixed so that a weight percentage of boehmite and alumina is in the range of 2.5:7.5 to 3.5:6.5.

According to an embodiment of the present invention, the first double-sided electrode and the single-sided electrode may be negative electrodes, and the second double-sided electrode may be a positive electrode.

Here, a reinforcement film may be stacked on a surface opposite to the surface to which the coating layer attached in the single-sided electrode. The reinforcement film may have stretch which means that the film is capable of being stretched and recovered beyond its original size, and the film may have heat resistance which means that the film is capable of maintaining its original mechanical properties even at a high temperature.

Furthermore, the reinforcement film having the stretch which is capable of being more stretched and recovered beyond its original size and the heat resistance which is capable of maintaining its original mechanical property even at a high temperature may entirely surround the folding separator at the outside of the folding separator.

The present invention further provides another embodiment in which a height of the electrode assembly is maximally reduced.

In an electrode assembly according to another embodiment, a plurality of unit cells are disposed in parallel to each other along a longitudinal direction of a folding separator and stacked as the folding separator is folded, wherein at least one of the unit cells comprises: a first single-sided electrode in which slurry is stacked on only one surface of a collector; a double-sided electrode which is stacked to contact the first single-sided electrode and in which the slurry is stacked on both surfaces of a collector; and a second single-sided electrode which is stacked to the double-sided electrode and in which the slurry is stacked on only one surface of a collector, wherein, in each of the first single-sided electrode and the second single-sided electrode, the slurry is stacked on a surface facing the double-sided electrode, and a coating layer preventing contact with the double-sided electrode and allowing ions to be accessible is applied to a surface of the slurry of each of the first single-sided electrode and the second-sided electrode.

In this embodiment, the first single-sided electrode and the second single-sided electrode may be negative electrodes, and the double-sided electrode may be a positive electrode.

Thus, the present invention may additionally provide a secondary battery in which the electrode assembly having the above-described technical features is assembled into a case (a pouch).

Advantageous Effects

According to the present invention having the above-described structure, the separator may be removed to reduce the thickness of the electrode assembly when compared to the electrode assembly according to the related art. That is, if the same volume is provided, the larger capacity may be realized. Furthermore, the separator may be removed to reduce the production cost.

Also, since the coating layer has the inspiratory property, the heat generation may be suppressed to improve the stability.

Furthermore, the present invention may have the effect of reducing the resistance of the outermost by removing the separator of the outermost electrode to mitigate or suppress the degradation of the electrode due to the resistance imbalance.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly, in which a plurality of unit cells are parallely placed to be spaced a predetermined distance from each other in a longitudinal direction of a folding separator 1 and are stacked due the folding of the folding separator 1, and an electrode constituting the electrode assembly (more particularly, an electrode disposed at the outermost layer of the unit cells constituting the electrode assembly).

Figure 2:
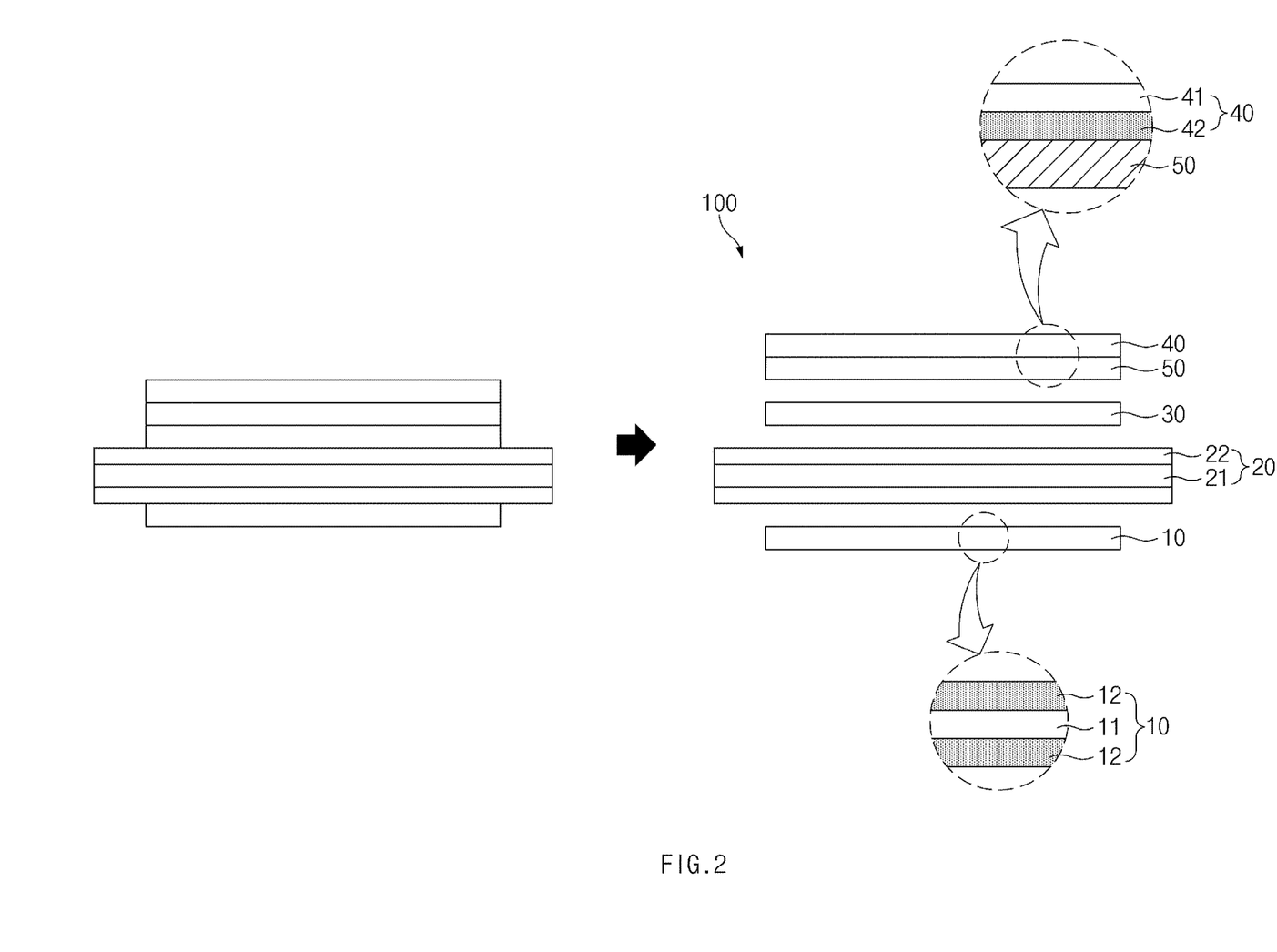
FIG. 2 is a side view illustrating a side surface of a unit cell according to Embodiment 1 of the present invention.

As illustrated in FIG. 2, in the electrode according to the present invention, slurry 42 is applied to only one surface of a collector 41 having both surface facing each other, and a coating layer 50 is additionally attached. The coating layer 50 is made of a material that blocks physical contact between the second double-sided electrode 30 and the slurry 42, which are adjacent to each other, but allows ion to be accessible therethrough. As described above, the electrode may be disposed at the outermost layer (however, the electrode may be disposed at positions except for the outermost layer according to a design of the electrode assembly), and the coating layer 50 may serve as a separator.

Hereinafter, embodiments of the present invention, in which the electrode is disposed at the outermost layer, will be described in more detail with reference to the accompanying drawings.

Embodiment 1

In this embodiment, separators 20 are removed one by one from unit cells 100 constituting an electrode assembly, and the electrode stacked at the outermost layer (the uppermost layer or the lowermost layer) comprises the coating layer 50.

That is, as illustrated in FIG. 2, one or more unit cells of the unit cells placed on the folding separator 1 have a structure in which a first double-sided electrode 10, a separator 20, a second double-sided electrode 30, and a single-sided electrode 40 are sequentially stacked.

According to this embodiment, in the first double-sided electrode 10, negative electrode slurry 12 is stacked on all both surfaces of the collector 11 as a negative electrode. The separator 20 has a structure in which a coating material 22 is applied to each of both surfaces of a base material 21. Here, one surface of the separator 20 is stacked to contact the first double-sided electrode 10. The second double-sided electrode 30 is a positive electrode of which one surface is stacked to contact the separator 20 and in which the positive electrode slurry is stacked on all both surfaces of the collector. Also, the single-sided electrode 40 is a single-sided negative electrode which is stacked adjacent to the second double-sided electrode 30 and in which negative electrode slurry 42 is stacked on only one surface facing the second double-sided electrode 30.

The single-sided electrode 40 may be the above-described electrode according to the present invention. Here, the coating layer 50 is attached (applied, coated, or stacked) on the slurry 42 at a side facing the second double-sided electrode 30.

The coating layer 50 prevents the negative electrode slurry 42 from directly contacting the positive electrode slurry of the second double-sided electrode 30 and allows lithium ions emitted from the positive electrode slurry 30 to be accessible.

In an embodiment of the present invention, the separator 20 is a safety-reinforcing separator (SRS) in which an inorganic coating material 22 is applied to both surface of the base material 21 made of a polyolefin-based material. In this embodiment, the inorganic coating material 22 contains at least one of boehmite or alumina. In detail, in the mixture, inorganic particles are mixed so that a weight percentage of boehmite and alumina is in the range of 2.5:7.5 to 3.5:6.5 (in more detail, it is preferable that the weight percentage of boehmite and alumina is 3:7). The detailed characteristics and mixing ratio of the SRS separator are well-known, and thus, detail description thereof will be omitted.

In this embodiment, the coating layer 50 attached or applied to the single-sided electrode 40 is a mixture of inorganic particles and a binder and has the same component as the coating material 22 applied to both the surfaces of the separator 20.

Furthermore, the mixture may be made of a material having a heat-absorbing property, or an additive may be added to the mixture so as to have the heat-absorbing property, thereby suppressing heat generation of the electrode assembly and improving stability.

Although the first double-sided electrode 10 and the single-sided electrode 40 are the negative electrodes, and the second double-sided electrode 30 is the positive electrode in this embodiment, the first double-sided electrode 10 and the single-sided electrode 40 may be the positive electrode, and the second double-sided electrode 30 may be the negative electrode.

Figure 3:
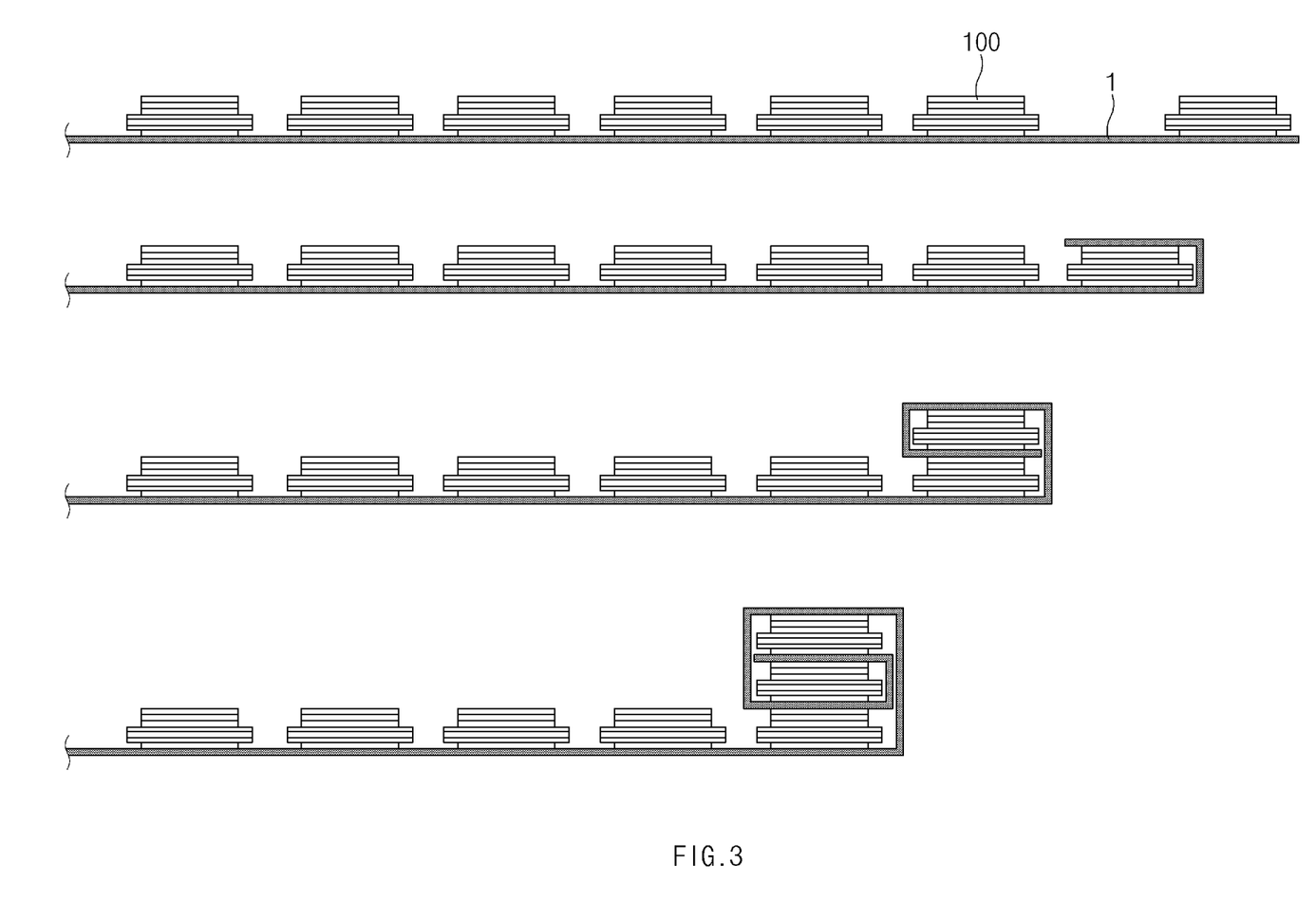
FIG. 3 is a view illustrating a state in which the unit cell of FIG. 2 is folded in the stack and folding manner.

As illustrated in FIG. 3, the unit cells 100 may be folded in the state in which the plurality of unit cells 100 are seated in parallel to each other on the folding separator 1.

Figure 4:
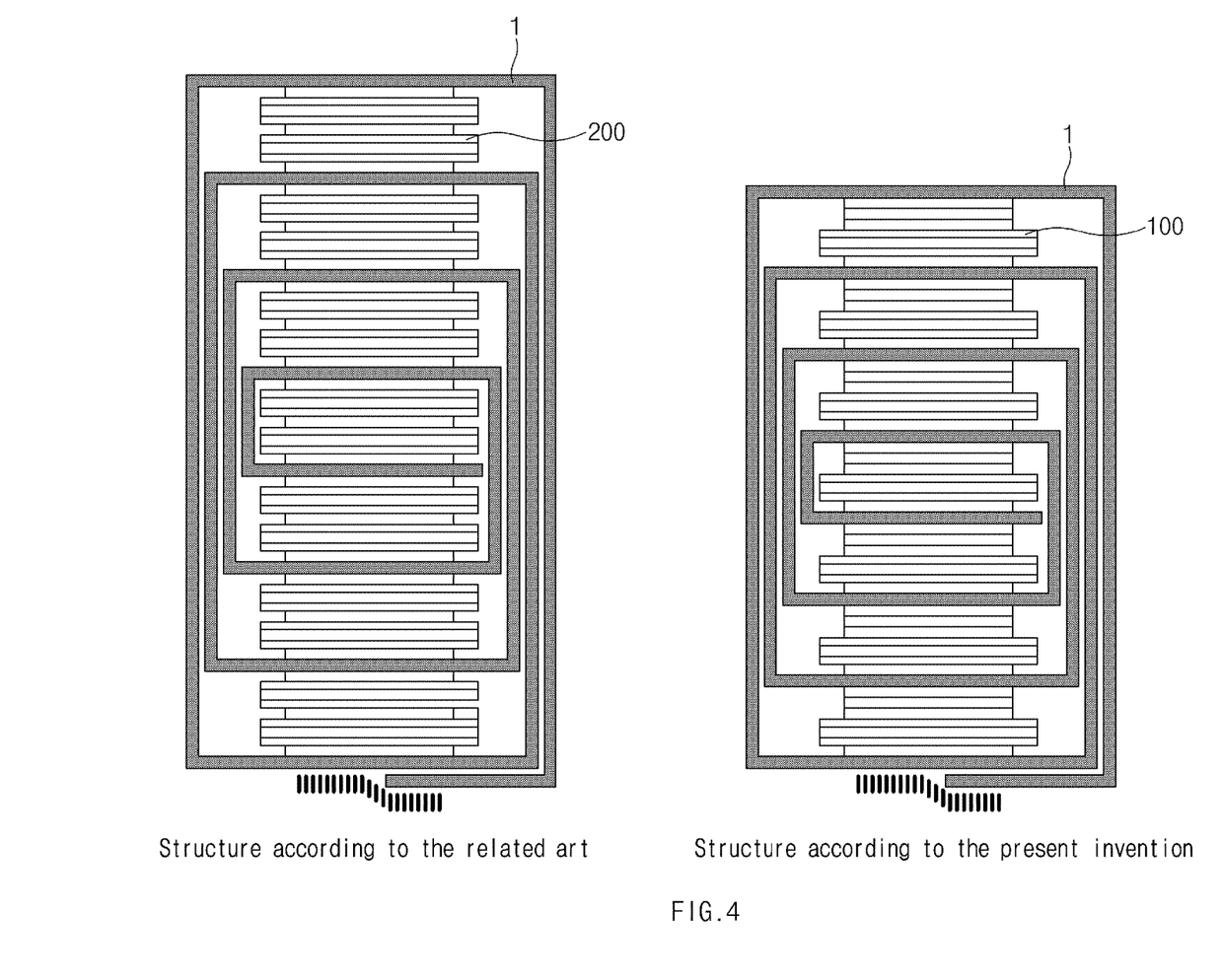
FIG. 4 is a side view comparing the electrode assembly, in which the unit cells according to the related art are folded, with an electrode assembly in which the unit cells according to Embodiment 1 of the present invention are folded.

For reference, in the electrode assembly, it is preferable that the unit cell 100 having the above-described structure (i.e., the unit cell in which the coating layer is attached to the single-sided electrode) is disposed at only the outermost layer (i.e., the uppermost layer and/or the lowermost layer) of the electrode assembly in consideration of the stability and the performance, and the unit cells disposed between the outermost unit cells (between the outermost layers) are provided as the unit cells according to the related art. However, the electrode assembly may be constituted by only the unit cells (the unit cells in which the coating layer is attached to the single-sided electrode), to which the above-described structure is applied, according to design specifications of the electrode assembly. In this case, when manufactured through the same stack and folding manner, if only the unit cells 100 according to the present invention are stacked, as illustrated in FIG. 4, the electrode assembly may decrease in height to reduce a volume when compared to the case in which the unit cells 200 according to the related art are used.

Experimental Data

The above experimental data compares the electrode assemblies according to the present invention with each other through Manufacturing examples and Comparative Examples. As shown in Table 1, it is seen that the thickness of the unit cell in which the separator is removed according to the present invention is reduced by 1.6% to 4.3% as compared with Comparative Examples 1 and 2. This thickness reduction shows a certain difference even when viewed from only the single electrode assembly, and furthermore, when being applied to a vehicle battery pack in which the secondary batteries are connected to each other to be used, a larger difference will appear.

TABLE 1

|  | Inorganic material composition | Initial thickness ratio (%) | Capacity retention rate after 800 cycles at room temperature (%) | Capacity retention rate after stored for 4 weeks at 60° C. (%) | Volume increase rate after stored for 4 weeks at 60° C. (%) |
| --- | --- | --- | --- | --- | --- |
| Manufacturing Example 1 of Embodiment 1 | Boehmite 100% | 98.4 | 82 | 93 | 103 |
| Manufacturing Example 2 of Embodiment 1 | Alumina 100% | 98.4 | 82 | 93 | 102 |
| Manufacturing Example 3 of Embodiment 1 | Boehmite:Alumina = 3:7 (weight ratio) | 98.4 | 83 | 93 | 102 |
| Comparative Example 1 | Boehmite:Alumina = 3:7 (weight ratio) | 100.0 | 80 | 93 | 104 |
| Comparative Example 2 | Boehmite:Alumina = 3:7 (weight ratio) | 102.7 | 75 | 90 | 108 |

Figure 6:
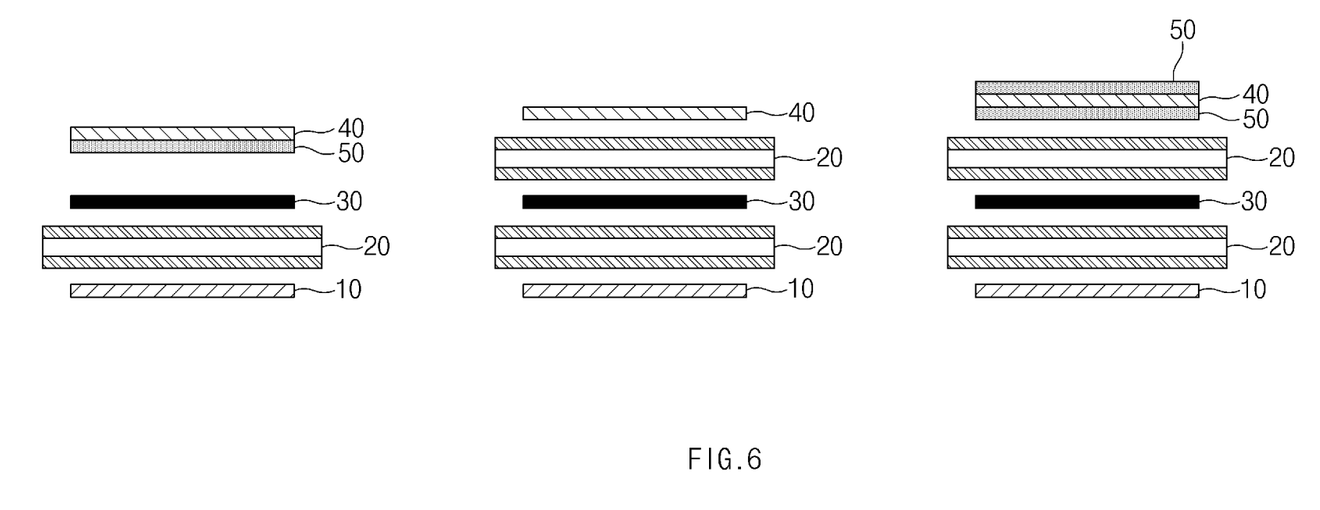
FIG. 6 is a side view illustrating unit cells applied to Manufacturing Examples 1, 2, and 3 and Comparative Examples 1 and 2 according to the present invention.

1. Manufacturing Examples 1 to 3 of Embodiment 1 represent an electrode assembly in which the single-sided negative electrode is stacked at the outermost portion in the unit cell stacked at the outermost layer, and the inorganic coating layer instead of the removed separator is applied or attached below the portion at which the single-sided negative electrode is stacked. Here, as illustrated in FIG. 6, which is a side view illustrating the state in which the unit cell applied to Manufacturing examples 1, 2, and 3 and Comparative Examples 1 and 2 of Embodiment 1, only the composition ratio of the inorganic material constituting the coating layer is changed.

2. Comparative Example 1 represents an electrode assembly in which a single-sided negative electrode is stacked at the outermost portion in the unit cell stacked on the outermost layer, and the separator instead of the inorganic coating layer is stacked below the single-sided negative electrode, and Comparative Example 2 represents an electrode assembly in which the inorganic coating layer is additionally applied to each of upper and lower layers of the outermost single-sided negative electrode in the structure of the Comparative Example 1.

3. The capacity retention rate after 800 cycles at room temperature means a capacity after charging and discharging are repeatedly performed 800 times at room temperature in the state of being manufactured as the secondary battery, the capacity retention rate after being stored for 4 weeks at 60° C. means a capacity in percent after being left for 4 weeks at 60° C. when the capacity is 100% after manufactured as the secondary battery, and the volume increase rate means a volume increase in percent after 60 days at 4° C. when the initial volume is 100%.

Furthermore, it is seen that the capacity retention rate and the volume increase rate after being stored for 4 weeks at 60° C. do not cause performance degradation as compared with the structure according to the related art, and the capacity retention rate after 800 cycles at room temperature (because the performance deterioration due to the temperature variation is relatively less) is improved as compared with the structure according to the related art.

Here, it is confirmed that the performance difference is slightly different depending on the composition ratio of boehmite and alumina, which are contained in the coating layer, but the performance difference due to the difference in composition ratio is negligible. That is, it is confirmed that the performance difference according to the component of the coating layer is negligible, but the thickness reduction and the performance change according to the presence or absence of the separator have a considerable difference.

Embodiment 2

The present invention further provides Embodiment 2 in which a height of the electrode assembly is maximally reduced.

A unit cell 300 according to Embodiment 2 is characterized in that the electrode having the coating layer is disposed on each of the outermost layers (the uppermost layer and the lowermost layer) as described above.

Figure 5:
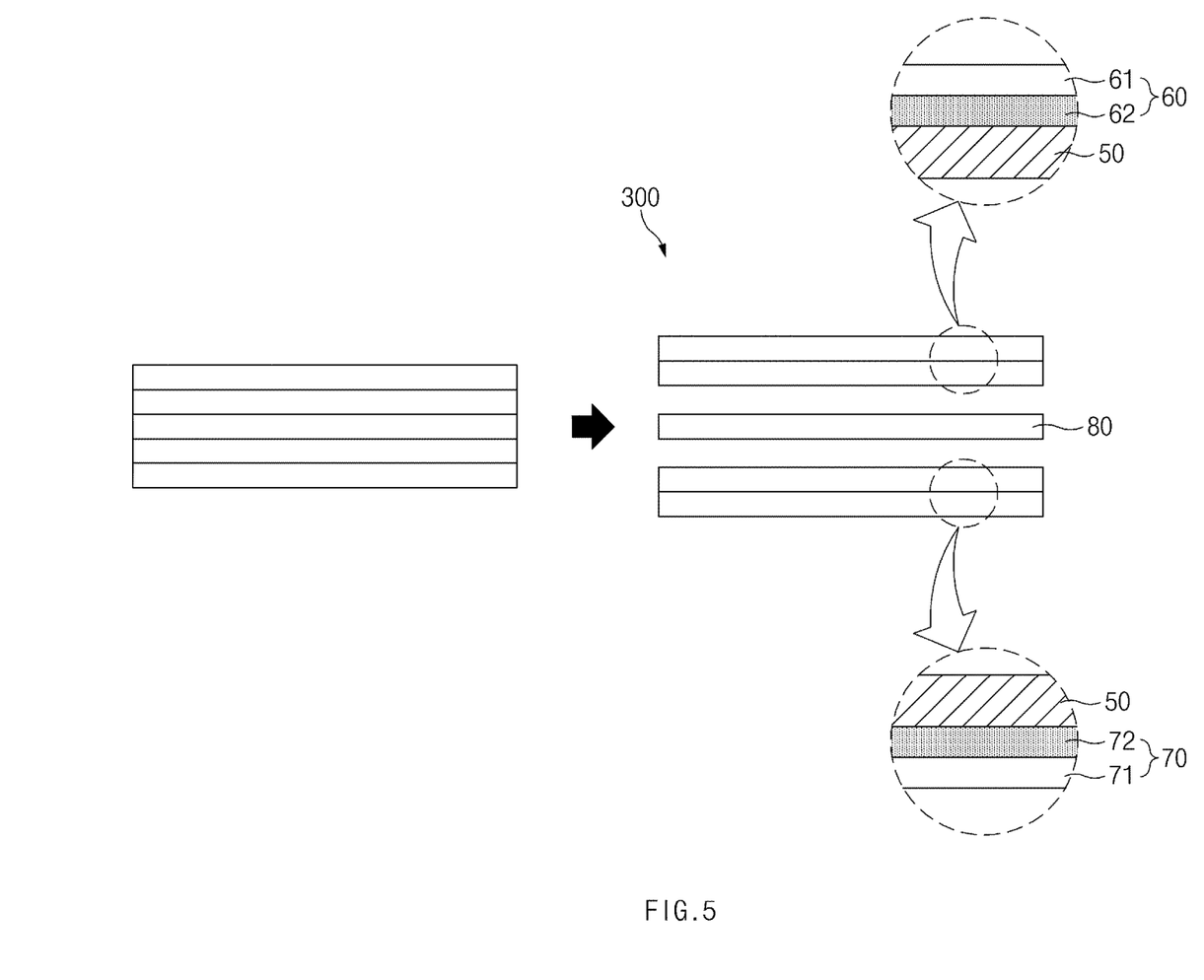
FIG. 5 is a side view illustrating a side surface of a unit cell according to Embodiment 2 of the present invention.

That is, as illustrated in FIG. 5, the unit cell 300 according to Embodiment 2 has a structure in which a first single-sided electrode 70, a double-sided electrode 80, the second single-sided electrode 60 are sequentially stacked. Here, separators between the electrodes are removed, and the first single-sided electrode 70 and the second single-sided electrode 60 are provided as the electrodes comprising the coating layer 50 as described above.

Thus, the double-sided electrode 80 has a structure in which slurry is applied to all both surfaces of a collector, whereas each of the first single-sided electrode 70 and the second single-sided electrode 60 has a structure in which each of slurry 72 and 62 is applied to only one surface of each of the collectors 71 and 61. Each of the slurry 72 and 62 respectively applied to the first single-sided electrode 70 and the second single-sided electrode 60 is applied to a side facing the double-sided electrode 80, and a coating layer 50 is additionally laminated on each of the slurry 72 and 62.

Thus, the coating layer 50 is positioned between the slurry 72 of the first single-sided electrode 70 and the double-sided electrode 80 and between the slurry 62 of the second single-side electrode 60 and the double-sided electrode 80. The coating layer 50 prevents the slurry 72 or 62 of the first single-sided electrode 70 or the second single-sided electrode 60 from directly contacting the slurry of the double-sided electrode 80 and allows ions to be accessible. In this embodiment as well, the first single-sided electrode 70 and the second single-sided electrode 60 are negative electrodes, and the doubles-sided electrodes 80 is a positive electrode, and vice versa.

Since all the separators are removed in this embodiment, a height of the electrode assembly may be more reduced as compared with the electrode assembly according to Embodiment 1. The unit cell 300 according to this embodiment is also preferably applied to only the outermost layer in the electrode assembly. However, the unit cell 100 according to Embodiment 1 may be used in combination with the unit cell 200 of the related art according to the required conditions.

Embodiment 3

The present invention additionally provides Embodiment 3 in which a reinforcement film F is stacked to enhance stability while compensating for a reduced thickness as a separator is removed.

Figure 7:
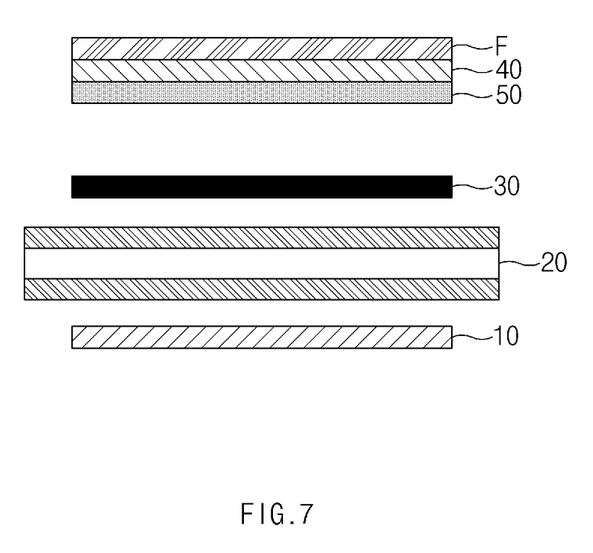
FIG. 7 is a side view illustrating a side surface of a unit cell according to Embodiment 3 of the present invention.

As illustrated in FIG. 7, which is a side view of a unit cell according to Embodiment 3, in the unit cell according to Example 3, the reinforcement film is additionally stacked on the outermost surface (a surface opposite to the surface contacting a coating layer) of a single-sided electrode that is disposed at the outermost layer.

The reinforcement film may preferably have a thickness similar to that of the removed separator and be selected from materials having high stretch which is capable of being sufficiently stretched and recovered beyond its original width and high heat resistance which is capable of maintaining its original mechanical property even at a high temperature.

Since the reinforcement film is not easily torn due to its high stretch, when a sharp object is impacted from the outside (for example, a nail test or the like), the highly stretchable reinforcement film may be stretched along the sharp object (for example, a nail for the test) to the inside of the unit cell to prevent the positive electrode, the negative electrode, and the sharp object from being electrically connected to each other, thereby preventing internal short-circuit from occurring and improving the safety.

Also, the reinforcement film having high heat resistance may be maintained its original shape without being melted even if the temperature of the electrode assembly rises due to the short circuit (at least until ignition occurs).

The reinforcement film may be manufactured in a state of adhering to the single-sided electrode through an adhesive or thermal fusion.

Embodiment 4

The present invention additionally provides Embodiment 4 in which a reinforcement film entirely surrounds an electrode assembly to enhance stability while compensating for a reduced thickness as a separator is removed.

Figure 8:
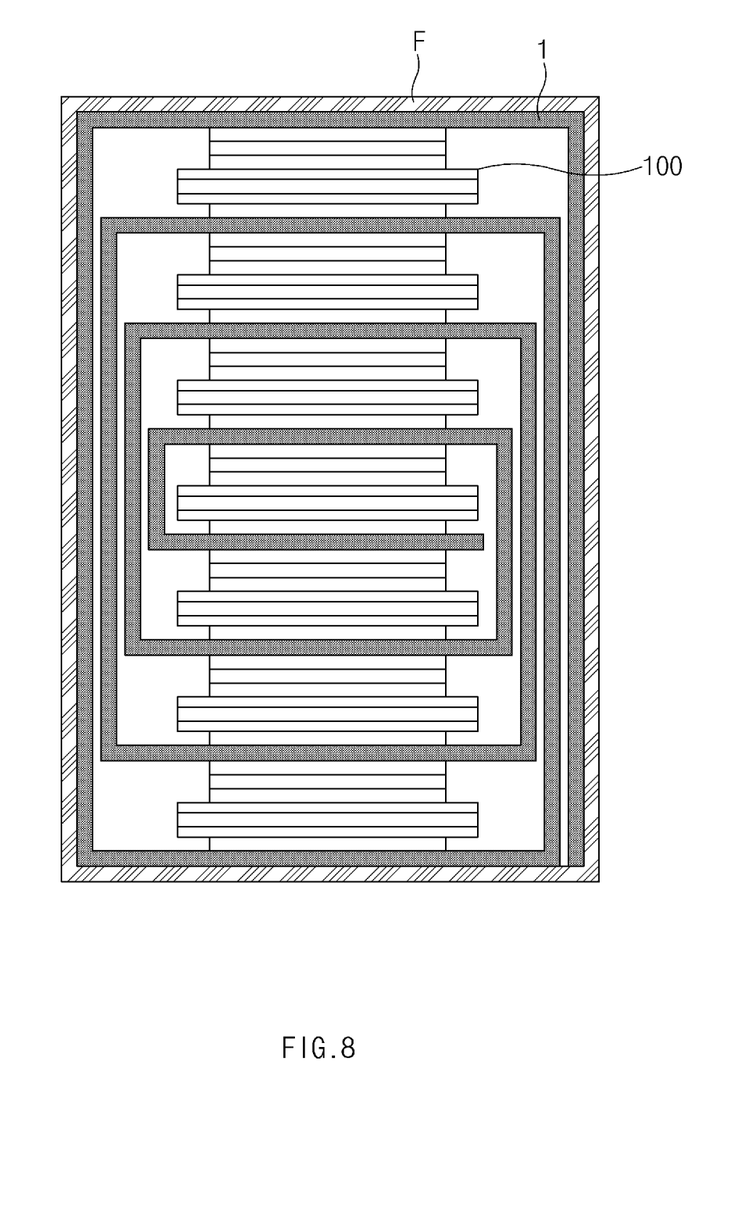
FIG. 8 is a side view illustrating a side surface of an electrode assembly according to Embodiment 4 of the present invention.

As illustrated in FIG. 8, which is a side view of an electrode assembly according to Embodiment 4, the electrode assembly according to Embodiment 4 is manufactured through the stack and folding manner like the structure illustrated in FIG. 4, and after manufactured, a reinforcement film is fixed to entirely surround the electrode assembly at the outside of a folding separator 1 instead of being fixed by a tape (a portion indicated by a dotted line at a lower end in FIG. 4).

The electrode assembly according to this embodiment may increase in thickness because of being surrounded by the reinforcement film, but may have the same thickness as the structure according to the related art as the separator is removed from the outermost layer. Instead, since the reinforcement film has high stretch and high heat resistance, it has greater stability against the external impact than the structure according to the related art, and it is possible to fix the electrode assembly without using the tape so as to suppress an occurrence of a stepped portion due to the attachment of the tape. The reinforcement film may be fixed through thermal fusion or an adhesive application method.

According to the present invention having the above-described structure, the separator 20 may be removed to reduce the thickness of the electrode assembly when compared to the electrode assembly according to the related art. That is, if the same volume is provided, the larger capacity may be realized. Furthermore, the separator 20 may be removed to reduce the production cost. In addition, the present invention may have the effect of reducing the resistance of the outermost by removing the separator of the outermost electrode to mitigate or suppress the degradation of the electrode due to the resistance imbalance and also suppress the lithium extraction.

Also, since the coating layer 50 has the inspiratory property, the heat generation may be suppressed to improve the stability.

Also, the additional reinforcement film may be provided to improve durability against the impact and simplify packaging structure.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly in which a plurality of unit cells are disposed in parallel to each other along a longitudinal direction of a folding separator and stacked as the folding separator is folded,
    wherein one of the unit cells comprises:
    a first double-sided electrode in which a slurry is stacked on opposite surfaces of a first collector;
    a separator stacked adjacent to the first double-sided electrode;

a second double-sided electrode which is stacked adjacent to the separator and in which a slurry is stacked on opposite surfaces of a second collector; and a single-sided electrode which is stacked adjacent to the second double-sided electrode and in which a slurry is stacked only on one surface of a third collector, the one surface facing the second double-sided electrode, the single-sided electrode having a coating layer stacked on the slurry thereof, the coating layer preventing contact between the slurry of the single-sided electrode and the slurry stacked on one of the surfaces of the second collector that faces the single-sided electrode, the coating layer allowing ions to pass therethrough, wherein the coating layer consists of a mixture of inorganic particles and a binder polymer, the slurry of the single-sided electrode being separated from the slurry of the second double-sided electrode that is adjacent to the single-sided electrode only by the coating layer.

2. The electrode assembly of claim 1, wherein the one of the unit cells is disposed at an outermost layer of the electrode assembly.

3. The electrode assembly of claim 1, wherein the separator comprises a coating material applied on opposite surfaces of a base material, and the mixture of the coating layer contains the coating material.

4. The electrode assembly of claim 1, wherein the first double-sided electrode and the single-sided electrode are negative electrodes, and the second double-sided electrode is a positive electrode.

5. The electrode assembly of claim 1, wherein a reinforcement film is stacked on another surface of the third collector opposite to the one surface of the third collector of the single-sided electrode, wherein the reinforcement film is configured to be stretched and recovered to an original size thereof and is configured to maintain original mechanical properties thereof at a temperature that has risen due to a short circuit of the electrode assembly.

6. The electrode assembly of claim 1, further comprising a reinforcement film entirely surrounding the folding separator at an outside of the folding separator, wherein the reinforcement film is configured to be stretched and recovered to an original size thereof and is configured to maintain original mechanical properties thereof at a temperature that has risen due to a short circuit of the electrode assembly.

7. The electrode assembly of claim 1, wherein the mixture has a heat-absorbing property.

8. The electrode assembly of claim 1, wherein the inorganic particles contain one or more of boehmite or alumina.

9. The electrode assembly of claim 8, wherein, in the mixture, the inorganic particles are mixed so that a weight percentage of boehmite and alumina is in the range of 2.5:7.5 to 3.5:6.5.

* * * * *